March 31, 1942. B. A. TETZLAFF 2,278,336
CLAMP
Filed June 1, 1940
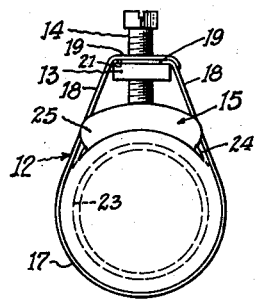
Fig. 5
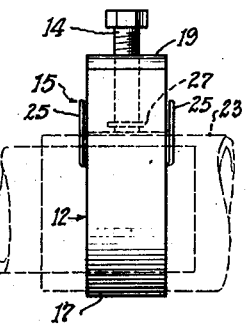
Fig. 6
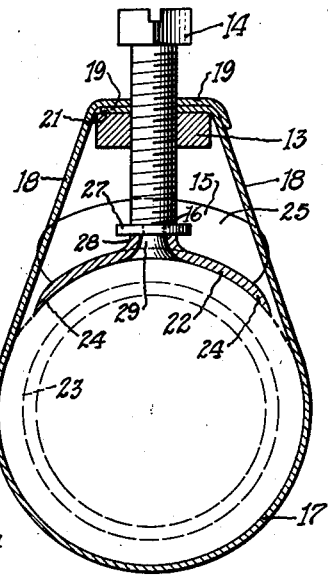
Fig. 8
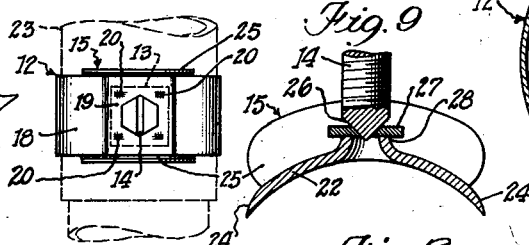
Fig. 7     Fig. 9
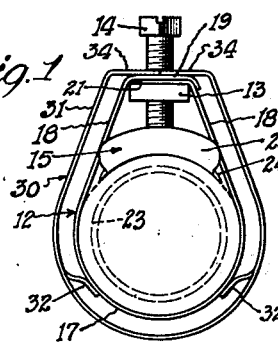
Fig. 1
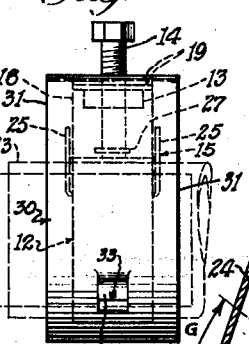
Fig. 2
Fig. 4
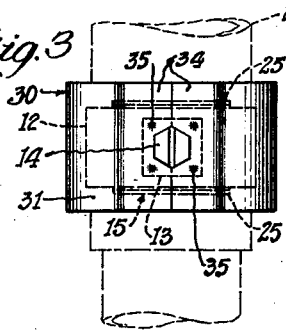
Fig. 3
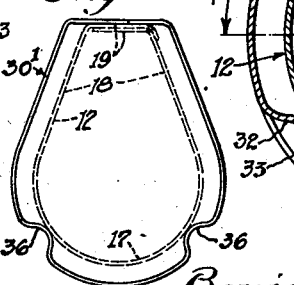
Fig. 10
Inventor:
Benjamin A. Tetzlaff
By: Frank J. Schraeder Jr.
Attorney Patented Mar. 31, 1942

2,278,336

UNITED STATES PATENT OFFICE 2,278,336

CLAMP

Benjamin A. Tetzlaff, Riverside, Ill.

Application June 1, 1940, Serial No. 338,351

10 Claims. (Cl. 24—19)

This invention relates to clamps adapted for telescopically securing a flexible or semi-flexible tubular connection, as for example, a hose, to a tubular connection, such as a pipe or any other tubular fluid inlet or outlet connection.

Clamps of a character similar to that disclosed herein, including a flexible band trained through spaced parts of an arcuate bridge and adjustably associated with a nut supported on a tightening screw, have been heretofore made by me and used extensively in many applications where flexible tubular members were connected to pipes, conduits, and other tubular connections, and while these former constructions have proven satisfactory in practically most instances, the herein disclosed improvements embody certain features and advantages not found in these former constructions whereby a clamp of simple construction and comparatively greater efficiency is attained, and which is adaptable for securely holding unusually high pressure hose connections.

One of the important objects of my invention resides in the provision of a metallic clamp having a heat-deflecting shield surrounding the clamp and spaced from practically the major portion of the clamp; such heat-deflecting shield being preferably provided with means for retaining it in fixed spaced position relatively to the clamp to thereby provide and maintain a suitable air space between the clamp and such shield whereby the heat from the shield may be more readily dissipated and direct transfer of heat by radiation and conduction reduced to a minimum. The heat-deflecting shield may be made of metal such as steel, or of any other suitable material of low thermal conductivity, such as a pressed asbestos composition.

Among other novel objects and distinctive features of my invention are the following:

(a) Simplified construction of parts.

(b) Provision of a clamp wherein the ends of the flexible clamp band are fixed to the nut, as by welding, to prevent movement relatively to the nut which is supported on the tightening screw.

(c) The floating bridge is not connected to, or adapted to embrace, the opposite flat faces of the clamp band; that is, the bridge is adapted for free movement unrestricted by any engagement with the clamp band.

In former clamps of this type, the bridge element was provided at its end with bent portions arranged to overlap and embrace the opposite flat faces of the clamp band, so that in the tightening operation of the clamp, the embraced band portions, which were slidably supported in the overlapped bridge ends, would move through such bridge ends. This construction caused the clamp band to be bent angularly at such overlapped bridge ends and imposed a frictional resistance between the band and the bridge ends.

The elimination of this frictional resistance not only affords the utilization of the full energy exerted by the tightening screw in clamping operation, but in precision clamping operations the clamping pressure of the clamp may be measured, as by the use of a torque-indicating wrench, so that uniform and predetermined clamp pressures may be imposed upon the clamp-connected member or members.

(d) In clamps which are subjected to repeated detachment and attachment, the band portions, which are bent and subjected to repeated bending, very often fracture at such bent portions. This disadvantage is overcome by my present floating bridge and band construction and arrangement whereby all bends in the band, at points which might be subjected to repeated bending, are obviated, thus permitting the use of stainless steel, or other special alloy, bands which tend to fracture in bending.

(e) The length of the cord of the arcuate bridge base, when in tightened or clamped position, is less than the clamped diameter of the band, and its ends do not extend beyond the points of tangency or the points of mergence of the straight portions of the band with the circular intermediate portion of the band.

(f) The end portions of the band are bent horizontally to lie in relatively overlapping position on top of the nut, and the bends in these end portions occur in spaced parallel planes which are substantially coincident with a pair of opposite sides of the nut. The terminus of the band end horizontal portion, which is disposed between the other horizontal band end portion and the nut, does not extend outwardly beyond the edge of the nut which is adjacent and parallel to such terminus, but preferably slightly inwardly of such edge. This feature affords bilateral symmetry in the arrangement of the relatively oppositely angular disposed side band portions and insures retainment of the longitudinal center line of the screw coincident with the vertical axis of the clamp.

(g) The rotatable screw is provided with a bearing at its point of support on the bridge, which bearing is of comparatively hard metal, such as steel or bronze, to provide a wear-resistant flat surface for the annular surface of the screw end since the screw is preferably made of comparatively soft metal to permit it to be readily peened at its end against displacement from the bridge. This bearing may be made in the form of a flat perforated washer loosely supported or press-fitted to the screw end, or it may be welded to the bridge.

With the above and other objects in view, my invention consists in the novel combination, construction and arrangement of the parts and members shown in preferred embodiments in the attached drawing, described in the following specifications, and particularly pointed out in the appended claims.

Referring to the drawing:

Fig. 1 is an end elevation of my improved clamp and shield embodying my invention;

Fig. 2 is a side elevation of same;

Fig. 3 is a plan view of same;

Fig. 4 is an enlarged vertical section of same;

Fig. 5 is an end view of the clamp portion;

Fig. 6 is a side elevation of the clamp shown in Fig. 5;

Fig. 7 is a plan view of the clamp portion;

Fig. 8 is an enlarged vertical section of the clamp portion shown in Figs. 5, 6 and 7;

Fig. 9 is a partial vertical section showing the support for the end of the screw in a freely floating bridge; and Fig. 10 illustrates a loosely supported heat-deflecting shield of preformed material of low thermal conductivity, such as press asbestos composition.

The clamp portion, shown more particularly in Figs. 5 to 8 inclusive, consists of a single band 12 of flexible metal, a nut 13 in threaded engagement with a screw 14, a bridge 15, and a bearing 16 for the end of the screw 14.

As shown in the illustrations, the clamp band 12 includes a substantially semi-circular medial portion 17 and substantially straight end portions 18 disposed angularly upwardly to converge toward the nut 13, and terminating in relatively oppositely bent horizontally disposed termini 19, preferably disposed in overlapping position on top of the nut 13. The terminal portions 19 are spot-welded to the nut, as indicated by 20 in Fig. 7.

The ends of termini 19 of the band could be shortened so as to abut on a lateral center-line of the nut 13 in the same manner as the heat-deflecting shield, as shown in Fig. 3, but I prefer to overlap such end portions, and to perforate same for the screw 14, so that the screw extends through the band ends 19 and thereby provides an additional safety factor in the event the welds 20 were severed by any undue tension exerted on the band 12.

In order to provide bilateral symmetry in design for the purpose of maintaining the longitudinal axis of the screw in a perpendicular position relatively to the horizontal axis of the clamp, the bends in the band at the terminal portions 19 occur in parallel vertical planes which are spaced substantially equidistant from the center-line or longitudinal axis of the tightening screw 14. These planes, in which these curved bends are disposed, extend just at or slightly beyond opposite sides of the nut 13. In the overlapping band end construction, one end 21, of the band end which is disposed between the nut 13 and the other or upper band end, is shortened to extend inwardly of the top side edge of the nut 13, as shown in Figs. 1, 4, 5 and 8, and the opposite corner edges of the upper face of the nut 13 may be slightly rounded to facilitate such equidistant bend arrangement and substantially bilateral symmetrical disposition of the upwardly converging band portions 18 relatively to the longitudinal and perpendicular axis of screw 14.

The bridge 15, which is constructed of a substantial metallic stamping or casting, functions to bridge or span substantially the full gap between the clamp-engaging circular band portion. The base portion 22 of the bridge is curved to conform to substantially the curve of the surface of the clamped member 23. The length of the arcuate bridge base portion 22 is such that its ends do not extend beyond the points of tangency at the mergence of the band medial portion 17 with the end portions 18 to avoid forcing or crowding of the bridge ends in between the clamp band and the member being clamped and possibly thereby indenting the clamped member if made of comparatively soft material.

Although this type of clamp is preferably designed to fit a specific or predetermined clamped diameter of the member to be clamped, it may be applied to a member which may be of a slightly smaller diameter, in which case, or in the event of any unusual excessive tightening of the clamp, the bridge ends may be brought into engagement with the band end portions 18; hence, the bridge base end portions 24 are thinned outwardly, as by swedging, to increase their flexibility and facilitate their forceful interposition between the clamped member and the band 12.

To stiffen the bridge 15, the base portion 22 is formed integrally with spaced arcuate side walls 25 which also function to properly guide the bridge in its tightening movement since the outer end portions of these sides embrace the side edges of the clamp band portions 18.

While the bridge 15 may be entirely free or floating, as indicated in Fig. 9, wherein the conical end 26 of the screw 14 is positioned within the central perforation of the annular bearing 27, I prefer to provide a loose connection between the screw 14 and the bridge 15 so as to prevent accidental loss or displacement of the bridge.

The bridge base 22 is provided with a diametrically outwardly upset perforated centrally disposed annular support 28, formed preferably with a flat annular face for support thereon of a suitable bearing 27, of steel or bronze, which is adapted to support thereon the flat annular face of the screw end.

The end of the screw 14 is provided with an extension 29 of decreased diameter which extends through the perforation of the bearing 27 into the perforation of the upset support 28 wherein its terminus is peened to loosely interlock the screw 14 with the bridge 15; the screw being freely rotatable in the support 28.

The annular disk-like bearing 27 may be loosely mounted about the screw extension 29, or press-fitted tightly thereon. The bearing 27 may also be welded to the upset bridge support 28.

The heat-deflecting shield, generally indicated by numeral 30, is illustrated in its preferred embodiment in Figs. 1 to 4 inclusive, and, as shown, consists of a flexible band 31 of any suitable material, such as steel, or of any suitable flexible material of low thermal conductivity, such as a pressed asbestos composition.

The general contour of the shield 30 conforms to that of the clamp band 12; however, the width of the shield band is preferably greater than that of clamp band 12 to enhance its shielding effect.

As shown in Figs. 1 to 4 inclusive, the flexible shield of steel is held in spaced relation to the clamp band 12 by means of a pair of inwardly bent integral spaced portions 32, perferably welded, as at 33, to the clamp band 12. The ends 34 are bent inwardly into abutment with one another for support on the ends of the clamp band and preferably simultaneously welded together with the clamp band ends to the nut 13, as indicated by 35 in Fig. 3.

The ends of the shield 30 are, of course, provided with semi-circular openings for the screw 14.

In clamped connections which are stationary and not subject to be bodily moved, the heat-deflecting shield 30 may be made of any suitable pre-formed material of low thermal conductivity, such as pressed asbestos, as generally illustrated in Fig. 10, wherein the shield 30¹ is preformed in an endless band, perforated for the screw 14 for support on the screw-end of the clamp, and provided preferably with a pair of spaced inwardly deflected portions 36 for retaining the shield 30 in spaced position relatively to the clamp.

My preferred design of a clamp of the type herein disclosed, when in clamped position, is based upon the following formulae:

X = longitudinal axis of tightening screw or vertical axis of clamp.
C = horizontal axis of clamp.
A = distance from the vertical axis of the clamp to the center of radius of arcuate bend in one end of the band.
B = distance from the vertical axis of the clamp to the center of radius of arcuate bend.
D = line intersecting tangent point and center of clamp.
E = line intersecting center of clamp and end of bridge.
H = distance from vertical axis of clamp to center of radius of arcuate bend in one end of shield.
J = distance from vertical axis of clamp to center of radius of arcuate bend in other end of shield.

*Formulae*

The arc G is substantially equal to the arc F.
The distance A is equal to the distance B.
The distance H is equal to the distance J.

I claim:

1. The combination with a clamp adapted for securing together a pair of telescoped members, of a heat-deflecting shield surrounding said clamp and supported on said clamp, said shield being disposed to deflect heat rays from impingement upon said clamp originating from a heat source which is external to said clamp.

2. The combination with a clamp adapted for securing together a pair of telescoped members, of a heat-deflecting shield surrounding said clamp and supported on said clamp, said shield having the greater portion of its body spaced from the side portions of said clamp, said shield being disposed to deflect heat rays from impingement upon said clamp originating from a heat source which is external to said clamp.

3. The combination as embodied in claim 2 and including means for retaining said shield body in said spaced relation to said clamp side portions comprising spaced portions of said shield extended into engagement with the clamp.

4. The combination with a hose clamp including a flexible metal clamping band and a member for tightening said band about the hose, of a heat-deflecting shield composed of a flat strip of material disposed in spaced relation to said clamping band, and means for securing the ends of said shield to said clamp, said shield being disposed to deflect heat rays from impingement upon said clamp originating from a heat source which is external to said clamp.

5. The combination as embodied in claim 4, and including said shield comprising a band of material which is wider than said clamping band.

6. The combination with a clamp comprising a nut, a single band of flexible metal having a substantially semi-circular medial portion and substantially straight integral end portions disposed tangentially to said medial portion and angularly one to the other in an outwardly converging direction; said end portions of the band having ends bent angularly in relatively opposite directions and secured in fixed position to one face of said nut, a tightening screw having threaded engagement with said nut, and an arcuate bridge adapted for actuation by said screw to tighten said band, said bridge including an arcuate base portion and radially outwardly disposed side walls formed integrally with said base portion, the ends of said bridge base extending slightly outwardly of the points of tangency of said straight band end portions with said band medial portion, and the radius of the bridge base being substantially equal to the radius of said medial portion of the band, of a heat-deflecting shield having a portion thereof in supporting-engagement with said bent end portions of said band, and spaced portions of said shield bent inwardly into engagement with said clamp band whereby said shield is retained in spaced relation to the sides of said clamp band.

7. The combination with a clamp comprising a nut, a single band of flexible metal having a substantially semi-circular medial portion and substantially straight integral end portions disposed tangentially to said medial portion and angularly one to the other in an outwardly converging direction; said end portions of the band having ends bent angularly in relatively opposite directions and secured in fixed position to one face of said nut, a tightening screw having threaded engagement with said nut, and an arcuate bridge disconnected from said band and adapted for actuation by said screw to tighten said band, said bridge including an arcuate base portion and radially outwardly disposed side walls formed integrally with said base portion, the ends of said bridge base extending to the points of tangency of said straight band end portions with said band medial portion when the clamp is tightened into final clamped position, and the radius of the bridge base being substantially equal to the radius of said medial portion of the band, of a heat-deflecting shield supported about said screw in spaced relation to the greater portion of said clamp band, said shield comprising a band of flexible material which is wider than said clamp band and having an integral portion bent inwardly into engagement with said clamp band to retain the shield in spaced position from the side of the clamp band.

8. In a clamping device, for a hose or the like connection, which comprises a flexible strip of material having interconnected end portions and means including a threaded tightening member for clampingly securing said strip to the hose connection; a heat-deflecting shield disposed in spaced relation to and about the greater portion of said clamping strip, said shield being wider than said clamping strip to extend beyond the side edges of said clamping strip; and means disposed at spaced portions of said shield for retaining said shield in spaced relation to said clamping strip; said tightening member extending outwardly through said shield and being operable to tighten or loosen said clamping strip without displacing said shield.

9. A clamping device for a hose or the like connection comprising, a flexible band, an arcuate bridge member, a threaded nut, a tightening screw extending through said nut into engagement with said bridge member, said band and said arcuate bridge engaging portions of the circumference of the hose connection, said clamp band having portions in engagement with said nut, and a heat-deflecting shield supported on said nut and disposed about, and spaced from, said clamp band, said tightening screw extending through said shield and being operable to tighten or loosen said clamp band without displacing said shield.

10. A clamping device for a hose or the like connection comprising, a flexible band, means for tightening said band about said connection, and a heat-deflecting shield supported on said band in spaced relation to the greater portion of said band, said shield being disposed between the hose connection and a source of heat external to the hose connection and said band-tightening means extending outwardly of said shield and being operable to tighten or loosen said band without displacing said shield.

BENJAMIN A. TETZLAFF.